May 12, 1942.   W. LEATHERS   2,283,070
AUTOMATIC METER-READING APPARATUS
Filed Oct. 18, 1940
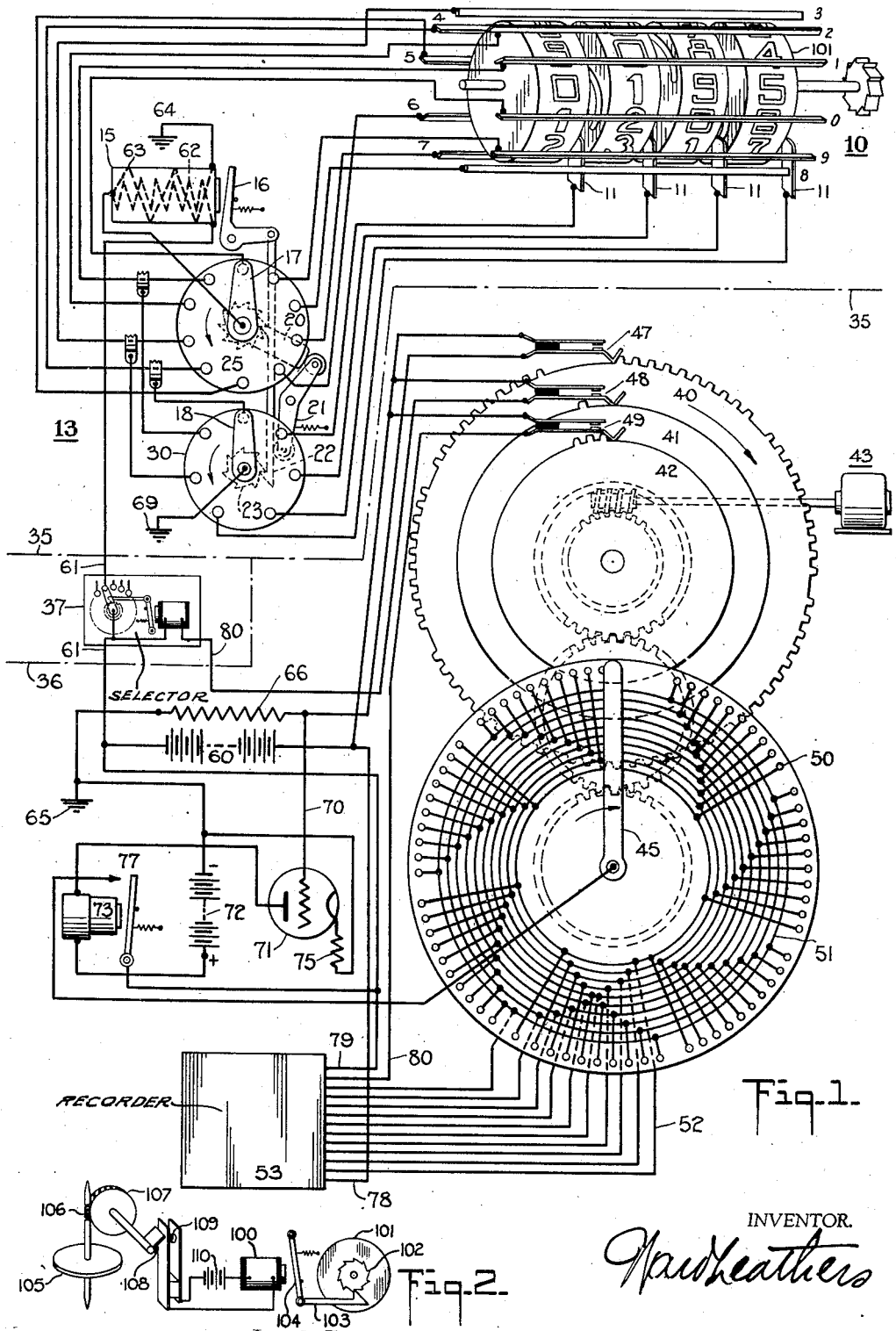
Fig_1_
Fig_2_
RECORDER
SELECTOR
INVENTOR.
Ward Leathers Patented May 12, 1942

2,283,070

UNITED STATES PATENT OFFICE 2,283,070

AUTOMATIC METER-READING APPARATUS

Ward Leathers, Brooklyn, N. Y., assignor, by mesne assignments, to International Business Machines Corporation Application October 18, 1940, Serial No. 361,799

6 Claims. (Cl. 177—351)

My invention pertains to the type of meter-reading and recording wherein many widely distributed consumer meters are read from a central reading station by means of a wire. In the present invention a recording cyclometer in the meter of a type more fully set forth in my copending application for Letters Patent, Serial No. 349,974, is read from central station by an impulse method as distinguished from that class of meter reading devices which measure the resistances of a plurality of resistances of varying values.

It will be understood that although in the accompanying drawing and in the following description the essential parts of a single meter have been illustrated and described, the meter reading system is applicable to the reading of a plurality of meters, which may be progressively or individually selected in the manner set forth in my above referred to application, by an impulse method.

In the accompanying drawing forming part of this specification one embodiment only of the invention has been disclosed for illustrative purposes. In the drawing:

Figure 1 is a diagrammatic view of a telelector reading system incorporating the principles of the present invention.

Figure 2 is a perspective diagram of the armature of a watt-hour meter and associated cyclometer-driving means.

Referring now to the drawing in detail, a cyclometer counter generally characterized by the numeral 10 having four numeral cylinders for recording up to four digits and operating in a manner common to meters and counters, contains means whereby each cylinder, in its rotation, causes contact to be made successively with each of ten electric bus-bars representing the numerals 0—1—2—3—4—5—6—7—8—9. The said means also comprises four brushes 11 for maintaining circuits through the said selecting means.

The cyclometer is operated by an electromagnet 100 shown in Fig. 2. A cyclometer wheel 101 has a ratchet 102 attached thereto, both being free on the shaft. When the electro-magnet 100 is energized, the ratchet 102 is advanced by means of a pawl 103 which is pulled by an armature 104. An armature 105 in a watt-hour meter, or any rotating or pulsating part in any kind of meter such as water meter, gas meter, etc., is actuated at a rate proportional to the amount of the commodity being used by the consumer. A worm-gear 106 on the shaft of the armature 105 rotates a gear 107 and reduces the speed of rotation. The gear 107 rotates a shaft to which a projection 108 is fastened. With every full revolution of the shaft, the projection causes a pair of contacts 109 to close. When the contacts 109 are closed a circuit is completed containing a battery 110 or other source of electrical energy and the electro-magnet 100. The electro-magnet is thus energized and is able to advance the cyclometer when a unit of electrical energy is consumed and measured by a watt-hour meter.

A stepping or phasing unit generally characterized by the numeral 13 is driven by an electromagnetic coil 15 which by means of an armature 16 rotates a distributor arm 17 one-tenth revolution per actuation and a distributing arm 18 one-seventh revolution per ten actuations of the arm 17. The latter ratio is obtained by means of a crank 20 joined to the distributor arm 17 which actuates a bell-crank 21 for holding a ratchet 22 against a ratchet wheel 23 during one out of ten of the actuations of the armature 16. Ten electrical distributing positions on the distributor 25 are electrically joined to the ten aforementioned bus-bars. Four of the electrical contact positions on the distributor 30 are electrically joined to the brushes 11. The other three electrical contact positions are joined electrically to any selected three conductors of the ten joined between the distributor 25 and the bus-bars. These three selective junctures are for the purpose of selecting, reading and recording a number indicative of the particular meter. As shown in Fig. 1, the various contacts of the distributor 30 are so connected electrically to the various bus bars that the arbitrary selected meter identifying number is one hundred and thirty-four.

That portion of the diagram above the dotted line 35 is located in or near the meter. That portion below the dotted lines 35—36 is located in the reading board at the central reading station. Between the two dotted lines is diagrammatically represented a local or field selector 37, the purpose of which is to select immediately upon the reading of a meter the next meter to be read.

In the reading board, discs, preferably of laminated Bakelite, 40, 41 and 42 are rotated in a clockwise direction at a constant speed by a motor 43. Geared to them is a distributor arm 45 which is rotated at the same speed in the same direction. As the discs 40, 41 and 42 turn, knobs on their peripheries actuate respectively the electric contacts 47, 48 and 49 each closing an associated circuit during the passage of each knob and breaking it therebetween. The distributor arm 45 distributes current to a series of contacts 50 to each of which it makes contact at exactly the same moment a knob on the disc 40 closes the contact at 47. The contacts 50 are in seven groups of ten each, each group representing numerals 0 to 9 and corresponding contacts of the group being electrically joined respectively to a corresponding common connection 51 of which there are ten. These ten common connectors are in turn electrically joined by conductors 52 to any suitable means of recording at 53. The disc 40 has seven groups of knobs of ten each. There is a space between each knob of dimension the equivalent of the removal of one knob. These seventy contacts are for the purpose of sending seventy impulses to the stepping or phasing unit 13 in the meter for providing one full meter-reading cycle, i. e., for the reading of one meter. The disc 41 has but one knob which is for the purpose of sending impulses to the selector 37 when the reading of a meter is concluded in order that the next cycle of impulses may be sent to the next meter to be read. The disc 43 has a desirable number of knobs, such as three grouped together. These knobs are for the purpose of sending impulses to the recording device for the recording of a suitable number of spaces between the meter-recordings where they are recorded on a tape or for the obtaining of any other electrical actuations desirable for setting up in the recorder such mechanism as needed for the separating of the recording of one meter from another. It will be noted in the diagram that the knobs on the discs 41 and 42 lie within a segment of the disc 40 having a continuous knobless face so that during the performance of functions associated with the discs 41 and 42 there are no impulses sent through the contacts 47 to any meter.

Thus it is evident that there are seventy impulses required for reading one meter and that the armature 16 is actuated seventy times for a meter-reading cycle.

A constant source of current, such as from a battery 60 is supplied through the long line 61 to the coil 15 in the meter where, after having passed through an inner winding 62 and an outer winding 63, it goes to ground at 64 and from thence returns to ground at 65. Then it passes through a resistance of fixed value 66, the contacts 47, and back to the other pole of the battery. This occurs every time a knob on the disc 40 closes the contacts 47. A conductor is joined between the contact arm 17 and a tap on coil 15 at a point midway of the inner and outer windings. The distributor arm 18 is joined to ground at 69.

When a circuit is closed between distributor arms 17 and 18 through the cyclometer 10, voltage from the battery 60 finds passage to ground at 69, because in the former instance it is obliged to traverse only one of the coil windings instead of both thereof, with less resistance than at 64. Tapped to this reading circuit at a point between the resistance 66 and the resistance 62, or 62 plus 63 as the case may be, is a line 70 joined to the grid of an electronic tube 71. When the circuit is grounded at 64, there is a definite voltage drop across resistor 66 which is imposed on the grid of the tube 71 in such manner as to tend to make the grid positive with respect to the cathode. A resistor 75 in the cathode circuit of the tube is of such value that it gives the grid enough negative bias to make the plate current insufficient to actuate a relay 73 the coil of which is in the plate circuit of the tube. When the circuit is grounded at 69, however, the voltage drop across resistor 66 becomes greater. The grid of tube 71 becomes more positive causing the relay 73 to actuate because of the increased plate current. A battery 72 furnishes plate energy for tube 71.

From the negative side of the battery 60 current is supplied by way of the armature-and-contact 77 to the distributor arm 45, from which it is conducted by means of one of the contacts 50, one of the common connections 51, and one of the conductors 52 to the recorder 53, from which a line 78 returns to the positive side of the battery 60. A line 79 from the negative side of the battery to the recorder 53, and 80 from recorder to the contacts 49 and back to the battery form a circuit for performing the functions heretofore described. Current from the negative side of the battery through an electro-magnetic selector in the field selector 37 is connected by means of a second long line 80 to the contacts 48 from which it returns to the battery. This is also for purposes heretofore described.

In the recorder 53 ten circuits comprising the conductors 52 and the common 78 are used for setting up any type of mechanism common to electro-printing or perforating or other recording apparatus.

What is claimed is:

1. In a telemetric system, a plurality of parallel reading circuits adapted to be individually and selectively closed to render indications of a plurality of respective magnitudes, a rotary selector switch including a plurality of terminal contacts for each circuit, said terminal contacts being arranged in a plurality of groups corresponding to the number of magnitudes, each group being inclusive of an entire set of the circuit contacts and the contacts in each group being similarly arranged, a scanning arm for successively and separately scanning the contacts of each group in succession and for traversing the groups successively, a source of energizing current for the circuits, a normally open relay-actuated switch common to all of said circuits for closing the selected circuit through the source and scanning arm, an impedance circuit including a resistance, means operable in phase with the scanning arm for energizing said impedance circuit to establish a predetermined potential differential across the resistance when the scanning arm is in engagement with a contact of each group whose circuit corresponds to the value of its respective magnitude, and means operable upon establishment of said potential differential across the resistance for actuating the relay-actuated switch.

2. In a telemetric system, a plurality of parallel reading circuits adapted to be individually and selectively closed to render indications of a plurality of respective magnitudes, a rotary selector switch including a plurality of terminal contacts for each circuit, said terminal contacts being arranged in a plurality of groups corresponding to the number of magnitudes, each group being inclusive of an entire set of the circuit contacts and the contacts in each group being similarly arranged, a scanning arm for successively and separately scanning the contacts of each group in succession and for traversing the groups successively, a source of energizing current for the circuits, a normally open relay-actuated switch common to all of said circuits for closing the selected circuit through the source and scanning arm, an impedance circuit including a resistance, means operable in phase with the scanning arm for energizing the impedance circuit to establish a predetermined potential differential across the resistance when the scanning arm is in engagement with a contact of each group whose circuit corresponds to the value of its respective magnitude, and electronic means operable upon establishment of said potential differential across the resistor for actuating the relay-actuated switch.

3. In a telemetric system, a plurality of parallel reading circuits adapted to be individually and selectively closed to render indications of a plurality of respective magnitudes, a rotary selector switch including a plurality of terminal contacts for each circuit, said terminal contacts being arranged in a plurality of groups corresponding to the number of magnitudes, each group being inclusive of an entire set of the circuit contacts and the contacts in each group being similarly arranged, a scanning arm for successively and separately scanning the contacts of each group in succession and for traversing the groups successively, a source of energizing current for the circuits, a normally open relay-actuated switch for closing the selected circuit through the source and scanning arm, a relay for said switch, electronic means for actuating the relay, an impedance circuit, a source of current therefor, a resistor disposed in said latter circuit, means operably connecting said electronic means and resistor whereby the former is responsive to a predetermined voltage drop across the latter to actuate the relay, means operable in phase with the scanning arm for decreasing the impedance value of the impedance circuit to establish said predetermined voltage drop when the scanning arm is in engagement with a contact of each group whose circuit corresponds to the value of its respective magnitude.

4. In a telemetric system, a plurality of parallel reading circuits adapted to be individually and selectively closed to render indications of a plurality of respective magnitudes, a rotary selector switch including a plurality of terminal contacts for each circuit, said terminal contacts being arranged in a plurality of groups corresponding to the number of magnitudes, each group being inclusive of an entire set of the circuit contacts and the contacts in each group being similarly arranged, a scanning arm for successively and separately scanning the contacts of each group in succession and for traversing the groups successively, a source of energizing current for the circuits, a normally open relay-actuated switch for closing the selected circuit through the source and scanning arm, a relay for said switch, electronic means for actuating the relay, an impedance circuit, a source of current therefor, a resistor disposed in said latter circuit, means operably connecting said electronic means and resistor whereby the former is responsive to a predetermined voltage drop across the latter to actuate the relay, a resistance element in the impedance circuit, and means operable in phase with the scanning arm for shunting said latter element from the impedance circuit to establish said predetermined voltage drop when the scanning arm is in engagement with a contact of each group whose circuit corresponds to the value of its respective magnitude.

5. In a telemetric system, a plurality of parallel reading circuits adapted to be individually and selectively closed to render indications of a plurality of varying magnitudes the values of which are expressed by the ten numerals of the Arabic system, a rotary selector switch including a plurality of terminal contacts corresponding in number to the number of magnitudes for each circuit, said contacts being arranged in groups of ten contacts each corresponding in number to the number of magnitudes, the contacts of each group being similarly arranged in the group, a scanning arm for successively and separately scanning the contacts of each group in succession and for traversing the groups successively, a source of energizing current for the circuits, a normally open relay-actuated switch for closing the selected circuit through the source and scanning arm, and means operable in phase with the scanning arm for controlling the closing of the relay-actuated switch when the scanning arm is in engagement with a contact of each group whose circuit corresponds to the value of its respective magnitude.

6. In a telemetric system, a plurality of normally open parallel branch circuits adapted to be individually and successively closed to render indications of a plurality of magnitudes, an impedance circuit including a resistor common to said branch circuits, a selector switch operable upon application of current impulses to the impedance circuit to sequentially connect said branch circuits in the impedance circuit, a plurality of reading circuits including a source of energizing current, a rotary distributor switch including a plurality of terminal contacts for each reading circuit and a rotary scanning arm for successive engagement with said terminal contacts, a normally open relay-actuated switch for closing a selected reading circuit through the source and scanning arm, means operable in phase with the scanning arm for periodically applying current impulses to the impedance circuit to actuate the selector switch and create a potential differential across said resistor, said relay actuated switch being responsive only to creation of a relatively high potential differential across the resistor, a current limiting impedance device in the impedance circuit, and means operable upon closing said branch circuits for shunting said impedance device from the branch circuits.

WARD LEATHERS.